US012767847B2

(12) United States Patent
Ozaki et al.

(10) Patent No.: US 12,767,847 B2
(45) Date of Patent: Oct. 20, 2026

(54) PROCESSING FLUID, SET OF PROCESSING FLUID AND INK, APPLYING DEVICE, IMAGE FORMING DEVICE, APPLYING METHOD, AND IMAGE FORMING METHOD

(71) Applicants: Daisuke Ozaki, Kanagawa (JP); Toshiyuki Kobashi, Tokyo (JP); Hiroshi Gotou, Kanagawa (JP); Juichi Furukawa, Kanagawa (JP)

(72) Inventors: Daisuke Ozaki, Kanagawa (JP); Toshiyuki Kobashi, Tokyo (JP); Hiroshi Gotou, Kanagawa (JP); Juichi Furukawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1086 days.

(21) Appl. No.: 17/652,821

(22) Filed: Feb. 28, 2022

(65) Prior Publication Data

US 2022/0282107 A1 Sep. 8, 2022

(30) Foreign Application Priority Data

Mar. 2, 2021 (JP) ................................ 2021-032642
Jan. 13, 2022 (JP) ................................ 2022-003425

(51) Int. Cl.

| | |
|---|---|
| ***C09D 11/54*** | (2014.01) |
| ***B41M 7/00*** | (2006.01) |
| ***C09D 11/02*** | (2014.01) |
| ***C09D 11/033*** | (2014.01) |
| ***C09D 11/037*** | (2014.01) |

(Continued)

(52) U.S. Cl.

CPC ........... *C09D 11/54* (2013.01); *B41M 7/0018* (2013.01); *C09D 11/02* (2013.01); *C09D 11/033* (2013.01); *C09D 11/037* (2013.01); *C09D 11/08* (2013.01); *C09D 11/10* (2013.01); *C09D 11/102* (2013.01); *C09D 11/328* (2013.01); *C09D 11/38* (2013.01); *C09D 11/40* (2013.01); *D06P 1/16* (2013.01); *D06P 1/5278* (2013.01); *D06P 1/67383* (2013.01); *D06P 5/002* (2013.01); *D06P 5/30* (2013.01); *D06P 3/42* (2013.01); *D06P 3/54* (2013.01)

(58) Field of Classification Search

CPC ........... D06P 1/5278; D06P 5/22; C09D 11/54
See application file for complete search history.

(56) References Cited

U.S. PATENT DOCUMENTS 4,851,504 A * 7/1989 Suzuki ............... C08G 63/6926 528/287
2007/0040880 A1* 2/2007 Jackson ............... C09D 11/322 106/31.86

FOREIGN PATENT DOCUMENTS

JP 10-088487 4/1998
JP 10-114140 5/1998

(Continued)

OTHER PUBLICATIONS

Torben Wiegand, et al., "Synthesis, Curing and Thermal Behavior of Amine Hardeners from Potentially Renewable Sources", Polymers, Feb. 16, 2023, 15, 990, pp. 1-12.

(Continued)

*Primary Examiner* — Sophie Hon
(74) *Attorney, Agent, or Firm* — Grüneberg Global IP, PLLC

(57) ABSTRACT

A processing fluid contains a resin having an amino group and an amine value of from 200 to 1,200 mgKOH/g and a polyvalent metal salt, wherein the proportion of the resin to the processing fluid is from 0.01 to 10 percent by mass and the processing fluid is applied to the fabric.

13 Claims, 1 Drawing Sheet

(51) Int. Cl.

| | |
|---|---|
| ***C09D 11/08*** | (2006.01) |
| ***C09D 11/10*** | (2014.01) |
| ***C09D 11/102*** | (2014.01) |
| ***C09D 11/328*** | (2014.01) |
| ***C09D 11/38*** | (2014.01) |
| ***C09D 11/40*** | (2014.01) |
| ***D06P 1/16*** | (2006.01) |
| ***D06P 1/52*** | (2006.01) |
| ***D06P 1/673*** | (2006.01) |
| ***D06P 5/00*** | (2006.01) |
| ***D06P 5/30*** | (2006.01) |
| *D06P 3/42* | (2006.01) |
| *D06P 3/54* | (2006.01) |

(56) References Cited

FOREIGN PATENT DOCUMENTS

| | | | | |
|---|---|---|---|---|
| JP | 2009-46780 | A | | 3/2009 |
| JP | 2009046780 | A | * | 3/2009 |
| JP | 2010-59287 | A | | 3/2010 |
| JP | 2010-174100 | A | | 8/2010 |
| JP | 2011-105805 | A | | 6/2011 |
| JP | 2015-40347 | A | | 3/2015 |
| JP | 2017-206789 | A | | 11/2017 |
| JP | 2018-3184 | A | | 1/2018 |
| JP | 2018083299 | A | * | 5/2018 |
| JP | 2019-11528 | A | | 1/2019 |
| JP | 2019-131919 | | | 8/2019 |
| JP | 2020-001200 | | | 1/2020 |
| JP | 2020164571 | A | * | 10/2020 |

OTHER PUBLICATIONS

Benjamin Vermeeren, et al., “From sugars to aliphatic amines: as sweet as it sounds? Production and applications of bio-based aliphatic amines”, The Royal Society of Chemistry, Chem. Soc. Rev., 2024, 46 pages.

Search Report received for Japanese Patent Application No. 2022-003425, mailed on Jun. 18, 2025, 20 pages with English translation.

* cited by examiner

PROCESSING FLUID, SET OF PROCESSING FLUID AND INK, APPLYING DEVICE, IMAGE FORMING DEVICE, APPLYING METHOD, AND IMAGE FORMING METHOD

CROSS-REFERENCE TO RELATED APPLICATIONS

This patent application is based on and claims priority pursuant to 35 U.S.C. § 119 to Japanese Patent Application Nos. 2021-032642 and 2022-003425, filed on Mar. 2, 2021 and Jan. 13, 2022, respectively, in the Japan Patent Office, the entire disclosures of which are hereby incorporated by reference herein.

BACKGROUND

Technical Field

The present disclosure relates to a processing fluid, a set of processing fluid and ink, an applying device, an image forming device, an applying method, and an image forming method.

Description of the Related Art

Since inkjet printers have an advantage of being capable of readily printing color images, they are now widely used at home to output digital information.

In addition to home use, inkjet printing is required to support printing on poorly permeable media such as coated paper, impermeable media such as plastic film, and fabrics such as woven fabrics and knitted fabrics with an image quality on a par with that of existing analog printing.

The market of direct printing on fabric such as T-shirts, so called direct to garment (DTG), is expanding year by year in the dyeing business. On the rise of personal recommendation business in apparel business and the trend of the active collaboration with fine art appearing in the interior textile field, there is demand for inkjet priming capable of printing images with excellent coloring and robustness on fabric.

Unlike screen printing and other common printing, inkjet printing for directly forming an image on fabric with ink containing a pigment obviates the need for manufacturing, storing, and rinsing a color plate. Moreover, this printing, which is suitable for high-mix low-volume manufacturing, quickens delivery by excluding transferring and demonstrates excellent light resistance. Ink for inkjet printing is thus required and has been developed.

The need for image forming on fabrics including synthetic fiber such as polyester material is rising.

It includes printing an image on fabrics already colored by dyeing or printing.

One way of printing an image on such colored fabrics, including dark color like black or navy blue, is to cover the fabrics with white ink before printing an image with color ink. The fabric treated in this manner demonstrates a sufficient coloring property. In this image forming, white ink is required to have a high level of whiteness, brightness, to conceal the dark color of fabric.

SUMMARY

According to embodiments of the present disclosure, a processing fluid is provided which contains a resin having an amino group and an amine value of from 200 to 1,200 mgKOH/g and a polyvalent metal salt, wherein the proportion of the resin to the processing fluid is from 0.01 to 10 percent by mass and the processing fluid is applied to the fabric.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
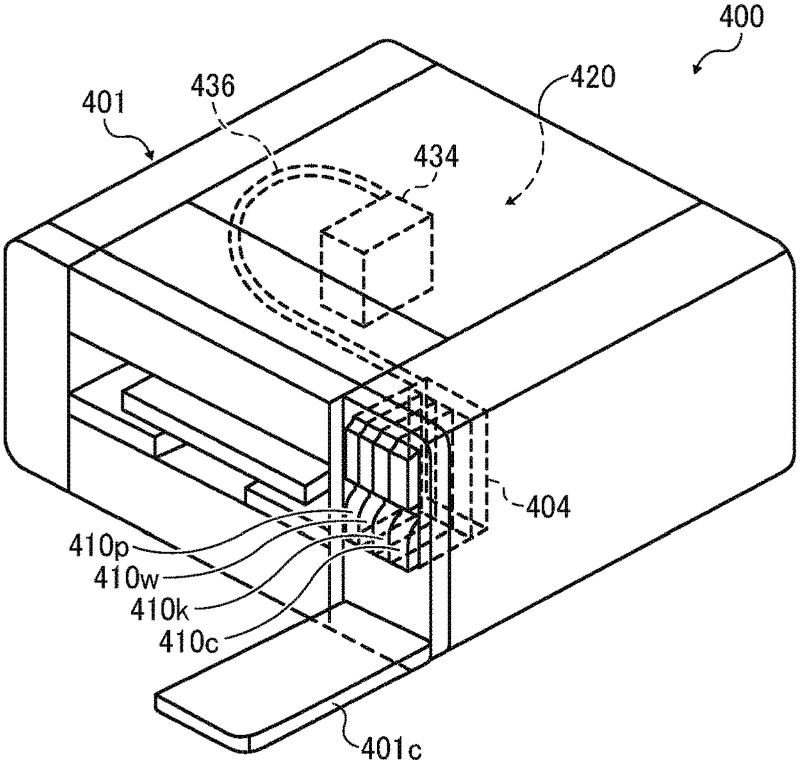
FIG. 1 is a schematic diagram illustrating an example of the image forming device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

For printing or dyeing with a white pigment inkjet ink composition, a cationic compound such as a polyvalent metal salt, an organic acid, or a cationic resin as a processing fluid composition for enhancing coloring properties has been proposed in unexamined Japanese Patent Application Publication No. 2019-131919.

According to the present disclosure, a processing fluid is provided which achieves a high level of coloring of an image formed with ink and prevents yellowing and deterioration of the coloring over time of the image.

Next, an embodiment of the present disclosure is described.

Processing Fluid

The processing fluid of the present disclosure contains a resin having an amino group, a polyvalent metal salt, and other optional components, preferably water, an organic solvent, a resin other than the resin having an amino group, hereinafter referred to as other resin, and a surfactant.

The processing fluid of the present disclosure is applied to fabric containing colored fiber.

"Fabric" in the present disclosure means a substance like textile, knitted work, and non-woven fabric, manufactured from fiber.

The fiber is preferably organic fiber including synthetic fiber, semi-synthetic fiber, regenerated fiber, and natural fiber. Of these, synthetic fiber is more preferable.

Specific examples of synthetic fiber include, but are not limited to, polyester, polyamide, acrylic, polyolefin, polyvinyl alcohol, polyvinyl chloride, polyurethane, and polyimide.

Specific examples of semi-synthetic fiber include, but are not limited to, acetate, diaceate, and triacetate.

Specific examples of regenerated fiber include, but are not limited to, polynosic, rayon, lyocell, and cupra.

Specific examples of natural fiber include, but are not limited to, cotton, hemp, silk, and wool.

Of these fibers, fiber colored with dispersion dye described later is preferable. Polyester or acetate fiber is more preferable and polyester fiber is furthermore preferable.

Biodegradable polyester compositions can be also used.

Biodegradable polyester compositions contain a substance such as biodegradable aliphatic-aromatic polyester or polylactic acid and an optional substance including an organic or inorganic filler.

Specific examples of biodegradable aliphatic-aromatic polyester include, but are not limited to, polybutylene adipate terephthalate (PBAT), polybutylene succinate terephthalate (PBST), and polybutylene sebacate terephthalate (PBSeT).

Organic filler includes natural starch, plasticized starch, modified starch, natural fiber, and wood flower.

Inorganic filler includes talc flour, montmorillonite, kaolin, chalk, calcium carbonate, graphite, plaster, conductive carbon black, calcium chloride, iron oxide, dolomite, silica, walloasonite, titanium dioxide, silicate, mica, glass fiber, and mineral fiber.

Fiber for use in fabric is colored by a colorant such as pigment and dye staining in or on the surface of fabric. "Colored fiber" in the present disclosure satisfies the following range: 60>L*, preferably 50>L*, more preferably 40>L*, and furthermore preferably 30>L*, and particularly preferably 20>L* when the luminosity (L*) of the fiber is measured by a spectrophotometer, e.g., X-rite eXact (manufactured by X-Rite Inc.). Fabric, an assembly of fiber, can be subjected to measuring of luminosity. If the luminosity of fabric is within the range specified above, the luminosity of the fiber contained in the fabric is generally within the range.

The colorant is not particularly limited and can be the same coloring material as contained in the ink described below; it is, however, preferably dye and more preferably dispersion dye. Synthetic fiber such as polyester fiber is generally dyed using a dispersion dye.

The inner structure of fiber is loosened by high temperature and high pressure treatment during which the dispersion dye is pressed into the substrate of the fiber. Therefore, unlike a reactive dye having a bonding force imparted by reaction, the dispersion dye is likely to transfer to an image at a contact between the dispersion dye and the component contained in the processing fluid or ink. This makes the problems to be solved of the present disclosure clear, in other words, the effect of the processing fluid of the present disclosure becomes apparent.

"Processing fluid" in the present disclosure means a liquid composition applied to the region of fabric where ink is to be applied before the ink is applied. The processing fluid is preferably free of a coloring material considering its purpose.

The processing fluid is applied to fabric before ink is applied. The processing fluid is also referred to as pre-processing fluid.

The processing fluid contains resin having an amino group.

In the present disclosure, the resin having an amino group means a polymer having a primary, secondary, or tertiary amino group in its molecule.

This polymer is not particularly limited and can be suitably selected to suit to a particular application. It can be a monopolymer having a repeated unit of a single structural unit or a copolymer having repeated units of different structural units. The copolymer is not particularly limited and can be suitably selected to suit to a particular application. It may have a structure having two or more different structural units regularly or irregularly arranged.

If a resin having an amino group is a copolymer, it has a structural unit having an amino group, which is a unit derived from a polymerizable compound, but may have a structural unit having no amino group.

The amine value of a resin having an amino group is from 200 to 1,200 mgKOH/g and preferably from 400 to 1,100 mgKOH/g.

Processing fluid containing resin having an amino group and an amine value of from 200 to 1,200 mgKOH/g minimizes coloring deterioration over time and yellowing of an image formed with ink applied to the region of fabric where the processing fluid has been applied.

The reason why the coloring deterioration over time and yellowing of an image formed with ink is minimized is explained below.

Processing fluid is generally used to enhance the concealing property of ink for the color of fabric containing colored fiber to which the ink is applied.

When a processing fluid is applied to fabric containing colored fiber and ink is then applied to the processing fluid applied region, an image formed with the ink demonstrates a high level of coloring; however, it involves a problem of the coloring deterioration over time. Moreover, this coloring deterioration accompanies yellowing of the image.

This is caused by the colorant that colors fiber transferring to an image formed with ink at a contact between the colorant and the processing fluid or ink.

The component in ink or processing fluid such as an organic solvent, resin, and solvent additive promotes the colorant to transfer to fabric because it has solubility or affinity to the colorant.

This problem becomes more serious in the case of white ink when the coloring material that colors fiber even minimally transfers to a white image formed with the white ink.

This problem becomes serious when fabric contains synthetic fiber such as polyester fiber. Synthetic fiber such as polyester fiber is generally colored using a dispersion dye. The inner structure of the fiber is loosened by high temperature and high pressure treatment, during which the dispersion dye is pressed into the substrate of the fiber. Therefore, unlike reactive dye having a bonding force imparted by reaction, dispersion dye is likely to transfer to an image at a contact with components contained in the processing fluid or ink.

This issue becomes worse when fabric is heated to dry the processing fluid or ink because, as the inner structure of the fiber loosens by heating, the colorant such as dispersion dye that colors the fiber transfers to an image in an accelerated manner.

This problem worsens in the case in which fabric is colored with a dark color such as black when the coloring material that colors fiber even minimally transfers to an image.

One way of preventing the colorant transferring from fabric containing colored fiber to an image is to treat the fabric with a processing fluid containing polyethylene imine in advance as proposed in unexamined Japanese Patent Application Publication No. H10-088487. However, this method suffers yellowing of an image as the fabric is heated.

This problem becomes more serious when white ink is applied after processing fluid because even a minimal yellowing in a white image formed with the white ink significantly affects the image quality.

The present inventors have found that one way of solving this problem is to use processing fluid containing a resin having an amino group and an amine value of 200 mgKOH/g or more. This resin traps the colorant that colors fiber, thereby preventing the colorant from transferring to an image formed with the ink so that the coloring deterioration over time of coloring is minimized.

The present inventors have also found that processing fluid containing resin having an amino group and an amine value of 1,200 mgKOH/g or less minimizes yellowing of an image formed with ink.

The resin having an amino group is not particularly limited and can be suitably selected to suit to a particular application as long as it has an amine value of from 200 to 1,200 mgKOH/g. Examples include, but are not limited to, polyamine such as polyethylene imine and polyether amine polyol; copolymers having a polyamine such as polyamine-epihalohydrin copolymer and amine-epihalohydrin copolymer; and copolymers having a polyamide such as polyamide polyamine-epihalohydrin copolymer. Of these, polyethylene imine is preferable to minimize the coloring deterioration over time.

These can be used alone or in combination.

The proportion of the resin to the entire processing fluid is from 0.01 to 10.0 percent by mass and preferably from 0.1 to 5.0 parts by mass. A resin having a proportion of 0.01 percent by mass or more can minimize the coloring deterioration over time of an image. A resin having a proportion of 10.0 percent by mass or less can minimize the occurrence of yellowing of an image formed with ink.

Polyvalent Metal Salt

The processing fluid contains a polyvalent metal salt.

A processing fluid containing the alcohol having an amino group enhances the level of coloring to an image formed with ink applied after the processing fluid to the region of fabric where the processing fluid has been applied.

This is because, at a contact between the polyvalent metal salt contained in processing fluid applied to fabric in advance and a coloring material contained in ink applied to the fabric, the coloring material agglomerates due to the charge function, so that it promptly separates from the liquid phase and fixes onto the surface of the fabric.

That is, images with good coloring can be formed even on a medium having large voids such as fabric because the coloring material stays on the surface of the fabric in a form of an aggregated layer formed due to the polyvalent metal salt in processing fluid.

High quality images can be formed even on fabric, having poor absorbency to ink because beading is minimized.

Unlike a coagulant such as a cationic polymer, a polyvalent metal salt can prevent the processing fluid from transferring to a contact member such as a conveyance member when the contact member contacts the region where the processing fluid has been applied before the ink is applied.

The polyvalent metal salt has no specific limit and can be suitably selected to suit to a particular application. Examples are salts including titanium compounds, chromium compounds, copper compounds, cobalt compounds, strontium compounds, barium compounds, iron compounds, aluminum compounds, calcium compounds, magnesium compounds, zinc compounds, and nickel compounds. These can be used alone or in combination.

The polyvalent metal salt includes a hydrate.

There is no specific limit to the magnesium compound and it can be suitably selected to suit to a particular application.

Specific examples include, but are not limited to, magnesium chloride, magnesium acetate, magnesium sulfate, magnesium nitrate, and magnesium silicate.

There is no specific limit to the calcium compound and it can be suitably selected to suit to a particular application. Specific examples include, but are not limited to, calcium carbonate, calcium nitrate, calcium chlorinate, calcium acetate, calcium sulfate, and calcium silicate.

There is no specific limit to the barium compound and it can be suitably selected to suit to a particular application. For example, barium sulfate is usable.

The zinc compound has no specific limit and is suitably selected to a particular application. For example, zinc sulfate and zinc carbonate are usable.

The aluminum compound has no specific limit and is suitably selected to a particular application. For example, aluminum silicate and aluminum hydroxide are usable.

Of these, calcium compounds, magnesium compounds, or magnesium compounds are preferable and alkali earth metal salts of calcium compounds and magnesium compounds are more preferable to effectively aggregate the coloring material in ink.

Calcium nitrate is highly deliquescent, which is particularly preferable to enhance the storage stability of processing fluid.

The proportion of the polyvalent metal salt to the entire processing fluid is preferably 5.0 percent by mass or greater, more preferably from 5.0 to 30.0 percent by mass, and furthermore preferably from 10.0 to 25.0 percent by mass. A proportion of a polyvalent metal salt of from 5.0 percent by mass or greater accelerates agglomeration of the coloring material in ink and makes the coloring material stay on fabric having large voids, thereby obtaining an image having good coloring. A proportion of a polyvalent metal salt of 30.0 percent by mass or less minimizes precipitation and crystallization of the polyvalent metal salt in processing fluid.

Water

The processing fluid may contain water. The proportion of water to the entire processing fluid is not particularly limited and can be suitably selected to suit to a particular application. The proportion is preferably from 10.0 to 90.0 percent by mass and more preferably from 20.0 to 60.0 percent by mass to enhance the drying property of the processing fluid.

Organic Solvent

The processing fluid may contain an organic solvent. The organic solvent is not particularly limited and includes polyols, ethers such as polyol alkylethers and polyol arylethers, nitrogen-containing heterocyclic compounds, amides, amines, and sulfur-containing compounds.

Specific examples of the water-soluble organic solvent include, hut are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene, glycol monoethyl ether, diethylene glycol monobutyl ether, triethylene glycol monobutyhl eter, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanol amine, diethanol amine, triethanol amine, and triethylamine; sulfur-containing compounds such as dimethyl sulfoxide, sulfolane, and thiodiethanol; propylene carbonate, and ethylene carbonate.

There is no specific limitation to the proportion of the other organic solvent and it can be suitably selected to suit to a particular application. Its proportion to processing fluid is preferably from 10.0 to 90.0 percent by mass.

Other Resin

The processing fluid may furthermore optionally contain other resins other than the resin having an amino group. The type of such resin is not particularly limited.

Specific examples include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Resin particles formed of these resins may be used. It is possible to obtain processing fluid by mixing a resin emulsion in which such resin particulate is dispersed in water as a dispersion medium with materials such as an organic solvent. It is possible to use suitably-synthesized resin particles as the resin particle. Alternatively, the resin particle is procurable. The resin particle can be used alone or two or more type of the resin particles can be used in combination.

There is no specific limitation to the volume average particle diameter of the resin particles and it can be suitably selected to suit to a particular application. The volume average particle diameter can be measured by using a device such as a particle size analyzer anotrac Wave-UT151, manufactured by MicrotracBEL Corp.).

There is no specific limitation to the proportion of the other resin and it can be suitably selected to suit to a particular application. It is preferably from 1.0 to 30.0 percent by mass to the mass of processing fluid.

Other Component

The processing fluid may optionally contain other components such as a surfactant, defoaming agent, preservative and fungicide, corrosion inhibitor, and pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application.

Of these, silicone-based surfactants not decomposed even at high pH environment are preferable. The silicone-based surfactants include, fix example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or polyoxyethylene poly oxypropylene group because these demonstrate good properties as aqueous surfactants. The silicone-based surfactant includes a polyether-modified silicone-based surfactant. A specific example is a compound in which a polyalkylene oxide structure is introduced into the side chain of the Si site of dimethyl silooxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both end-modified polydimethyl siloxane, one-end-modified polydimethyl and side-chain-both-end-modified polydimethyl siloxane. In particular, a polyether-modified silicone-based surfactant having a polyoxyethylene group or a polyoxyethylene polyoxypropylene group is particularly preferable because such a surfactant demonstrates good property as an aqueous surfactant.

Such surfactants can be synthesized or procured. Products can be procured from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

Chemical Formula S-1

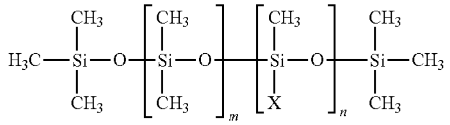

$X = —R(C_2H_4O)_a (C_3H_6O)_b R'$

In Chemical Formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

As the fluorochemical surfactant, a compound in which the number of carbon atoms replaced with fluorine atoms is from 2 to 16 is preferable and, from 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because these do not easily foam and the fluorochemical surfactant represented by the following Chemical Formula F-1 or Chemical Formula F-2 is preferable.

$CF_3CH_2(CF_2CF_2)_m—CH_2CH_2O(CH_2CH_2O)_nH$ Chemical Formula F-1

In the compound represented by Chemical Formula F-1, "m" is preferably 0 or an integer of from 1 to 10 and "n" is preferably 0 or an integer of from 1 to 40.

$C_nF_{2n+1}—CH_2CH(OH)CH_2—O—(CH_2CH_2O)_n—Y$ Chemical Formula F-2

In the compound represented by the Chemical Formula F-2, Y represents H or $C_mF_{2m+1}$, where n represents an integer of from 1 to 6, or $CH_2CH(OH)CH_2—C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

The fluorochemical surfactant can be procured.

Specific examples of the procurable products include, but are not limited to, SURFLON S-111, SURFLON S-112, SURFLON S-113, SURFLON S-121, SURFLN S-131, SURFLON S-132, SURFLON S-141, and SURFLON S-145 (all manufactured by ASAHI GLASS CO., LTD.); FLUORAD FC-93, K-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES).

There is no specific limitation to the proportion of surfactant and it can be suitably selected to suit to a particular application. The proportion is preferably from 0.001 to 5 percent by mass to processing fluid.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates.

pH Regulator

There is no specific limitation to pH regulator as long as it can adjust pH to 7 or higher.

Properties of Processing Fluid

Properties of the processing fluid are not particularly limited and can be suitably selected to suit to a particular application. For example, the viscosity and surface tension are preferable in the following ranges.

The viscosity of processing fluid at 25 degrees C. is preferably from 0.5 to 30 mPa·s and more preferably from 0.5 to 10 mPa·s to achieve good applicability. The viscosity can be measured by equipment such as a rotatory viscometer (RE-80L, manufactured by TOKI SANGYO CO., LTD.). The measuring conditions are as follows:

Standard cone rotor (1°34'×R24)

Sample liquid amount: 1.2 mL

Rate of rotations: 50 rotations per minute (rpm)

25 degrees C.

Measuring time: three minutes.

The surface tension of processing fluid is preferably 35 mN/m or less and more preferably 32 mN/m or less at 25 degrees C. in order to suitably level the processing fluid on fabric and shorten the drying time of processing fluid.

Set of Processing Fluid and Ink

The set of the processing fluid and ink of the present disclosure includes the processing fluid of the present disclosure, ink, and other optional components.

The processing fluid is the same as that of the present disclosure.

The set of ink and processing fluid may furthermore include the fabric described above.

Ink

As described above, the ink is a liquid composition applied to the region of fabric where processing fluid is applied.

The ink contains an organic solvent, water, a coloring material, a resin, and other optional components such as a surfactant to suit to a particular application.

As for the organic solvent, water, surfactant, and the other components such as a surfactant, the description thereof is omitted because the same components as those for the processing fluid can be used.

The ink is preferably white ink.

In the case of white ink, even a minimal transfer of a colorant that colors fabric to a white image formed with white ink has a large impact and degrades coloring and yellowing of the image so that the effect achieved by the processing fluid of the present disclosure becomes significant.

In the present disclosure, "white ink" forms an image of color referred to as "white" which is appropriately accepted under normal social conventions and includes slightly colored white.

It also includes products sold under the name of "white ink".

It further includes ink that satisfies the following range of $60 \leq L^* \leq 100$, $-4.5 \leq a^* \leq 2$, and $-6 \leq b^* \leq 2.5$, where the luminosity ($L^*$) and chromaticity ($a^*$, $b^*$) of a solid image of ink attached to white polyester fabric in an amount of 30 $mg/cm^2$ are measured by a spectrophotometer, e.g., X-rite eXact (manufactured by X-Rite Inc.).

The luminosity ($L^*$) and chromaticity ($a^*$, $b^*$) of a solid image is the method for representing the color regulated by Commission internationale de l'eclairage (CIE).

White ink is preferably used to form a white image as the base on fabric for enhancing the coloring of a non-white image formed with non-white ink which is applied onto the white image.

This non-white ink also contains an organic solvent, water, a non-white coloring material, a resin, and other optional components such as a surfactant to suit to a particular application. "non-white ink" in the present disclosure represents the ink other than the white ink mentioned above.

Coloring Material

The coloring material includes materials such as a pigment and a dye. The pigment includes an inorganic pigment or organic pigment. These can be used alone or in combination. A mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others. Of these, white pigment is preferable to prepare white ink as described above.

Specific examples of inorganic pigments include, hut are not limited to, titanium oxide, iron oxide, tin oxide, zirconium oxide, titanic acid iron as a complex oxide of iron and titanium, calcium carbonate, barium sulfate, aluminum hydroxide, barium yellow, cadmium red, and chrome yellow, and carbon black manufactured by known methods such as contact methods, furnace methods, and thermal methods. Of these inorganic pigments, titanium oxide, iron oxide, tin oxide, zirconium oxide, and titanic acid iron as a complex oxide of iron and titanium are preferable to prepare white pigment. Titanium oxide is more preferable to achieve a high refractive index and a high level of whiteness.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of these pigments, pigments having good affinity with solvents are preferable. Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 1.55, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material to the entire ink is preferably from 1 to 20.0 percent by mass and more preferably from 1.0 to 10.0 percent by mass to enhance the image density, fixability, and discharging stability.

The proportion of the white pigment to the entire ink is preferably from 1 to 20.0 percent by mass and more preferably from 6 to 15.0 percent by mass to enhance the image density and discharging stability.

Pigment-dispersed ink is obtained by, for example, preparing a self-dispersible pigment through an introduction of a hydrophilic functional group into a pigment, coating the surface of a pigment with a resin followed by dispersion, or using a dispersant for dispersing a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a resin by coating the surface thereof is to encapsulate a pigment in a microcapsule to make it disperse in water. This can be referred to as a resin-coated pigment. In this case, all the pigments to be added to ink are not necessarily entirely coated with a resin. Pigments never or partially coated with a resin may be dispersed in the ink.

A known dispersant of a small or large molecular weight, which is represented by a surfactant, can be used to disperse the coloring material in ink. It is possible to select an anionic surfactant, a cationic surfactant, a nonionic surfactant, an amphoteric surfactant, or others depending on a pigment. Also, a nonionic surfactant (RT-100, manufactured by TAKEMOTO OIL & FAT CO., LTD.) and a formalin condensate of naphthalene sodium sulfonate are suitable as the dispersant. Those can be used alone or in combination.

Other Optional Components

The other components include helping additives in addition to those mentioned for the processing fluid. One of the helping agent is silicon dioxide. Ink containing a helping agent is likely to scatter light and enhances the degree of whiteness in the case of white ink.

Property of Ink

The properties of ink are not particularly limited and can be suitably selected to suit to a particular application. For example, viscosity, surface tension, and pH are preferably in the following ranges.

The viscosity of the ink at 25 degrees C. is preferably from 5 to 30 mPa·s and more preferably from 5 to 25 mPa·s to improve the print density and text quality and achieve good dischargeability. The viscosity can be measured by equipment such as a rotatory viscometer (RE-80L, manufactured by TOKI SANGYO CO., LTD.). The measuring conditions are as follows:

Standard cone rotor (1°34×R24)

Sample liquid amount: 1.2 mL

Rate of rotations: 50 rotations per minute (rpm)

25 degrees C.

Measuring time: three minutes.

The surface tension of ink is preferably 35 mN/m or less and more preferably 32 mN/m or less at 25 degrees C. because the ink suitably levels on fabric and the ink dries in a shorter time.

pH of the ink is preferably from 7 to 12 and more preferably from 8 to 11 to prevent corrosion of metal material in contact with liquid.

The processing fluid and the ink mentioned above can be combined as a set. The ink is preferably white ink as described above.

It is possible to integrally or separately manufacture or sell a container containing processing fluid and a container containing ink as a set.

If a processing fluid container and an ink container are independently manufactured or sold and the processing fluid and the ink are required or guided to be used in combination, this processing fluid and the ink constitute the set mentioned above.

Applying Device for Applying Processing Fluid and Applying Method of Applying Processing Fluid The applying device for applying processing fluid of the present disclosure includes a container containing the processing fluid of the present disclosure, a unit for applying the processing fluid to fabric, and other optional devices.

The applying device is not particularly limited as long as it includes the container containing the processing fluid and the unit for applying the processing fluid. The applying device can be configured alone; however, it can be integrated into an image forming device by combining with another device such as an ink application device.

The applying method for applying processing fluid of the present disclosure includes applying the processing fluid to fabric and other optional steps.

The applying method of the present disclosure is executed by the applying device of the present disclosure. The applying method of applying processing fluid of the present disclosure is described together with the applying device for applying processing fluid of the present disclosure.

Container for Containing Processing Fluid

The container for containing processing fluid is not particularly limited and can be a known inkjet cartridge.

Unit for Applying Processing Fluid and Application of Processing Fluid

The unit for applying processing fluid applies processing fluid to fabric.

Application of processing fluid is to apply processing fluid to fabric.

The processing fluid is the same as that of the present disclosure.

The fabric is the same as that described for the processing fluid of the present disclosure.

The processing fluid can be applied by discharging or coating.

The discharging is not particularly limited and can be suitably selected to suit to a particular application. For example, it is possible to discharge processing fluid by using a piezoelectric element actuator, thermal energy, actuator utilizing an electrostatic force, or a continuous jetting charging control head.

Specific examples of coating include, but are not limited to, blade coating, gravure coating, gravure offset coating, bar coating, roll coating, knife coating, air knife coating, comma coating, U comma coating, AKKU coating, smoothing coating, micro gravure coating, reverse roll coating, four or five roll coating, dip coating, curtain coating, slide coating, and die coating.

The amount of processing fluid applied to fabric is preferably from 10 to 50 $mg/cm^2$ and more preferably from 20 to 40 $mg/cm^2$ in the application of processing fluid. An amount of processing fluid applied of 10 $mg/cm^2$ or greater enhances the image quality and an amount of 50 $mg/cm^2$ or less minimizes uneven coloring caused by precipitation of the solid content of the processing fluid.

Other Optional Device and Other Optional Steps

The other optional devices are not particularly limited and can be suitably selected to suit to a particular application. It may include a control device.

The other processes are not particularly limited and can be suitably selected to suit to a particular application. It may include a control process is process.

Heating Device and Heating

The heating device heats the fabric where the processing fluid has been applied.

In the heating, the fabric where the processing fluid has been applied is heated.

The applying method for applying processing fluid and the image forming method may include heating, referred to as first heating, fabric after the processing fluid is applied to the fabric.

The processing fluid applied onto the fabric is dried during heating.

The heating temperature during heating is preferably 60 degrees C. or higher and more preferably 80 degrees C. or higher, and furthermore preferably 100 degrees C. or higher.

The processing fluid is heated in the image forming method described later before the application of ink described later.

The heating device is not particularly limited and can be selected from known heating devices, it includes a roll heater, a drum heater, a heated wind generator, and heat pressing device.

The image forming device includes a container containing processing fluid, a unit for applying the processing fluid to fabric, a unit for applying ink to the region of the fabric where the processing fluid has been applied, and other optional devices.

The image forming method includes applying the processing fluid to fabric, applying ink to the region of the fabric where the processing fluid has been applied, and other optional steps.

The image forming method of the present disclosure is executed by the image forming method of the present disclosure. The image forming method of the present disclosure is described together with the image forming device of the present disclosure.

Container for Processing Fluid

The container for containing processing fluid is the same as that of the applying device of the present disclosure.

Unit for Applying Processing Fluid and Application of Processing Fluid

The unit for applying processing fluid is the same as that of the applying device of the present disclosure.

The application of processing fluid is the same as that of the applying method for applying processing fluid of present disclosure.

Unit for Applying Ink and Application of Ink

The unit for applying ink applies ink to the region of fabric where the liquid composition has been applied.

In the ink application, ink is applied to the region of fabric where the processing fluid has been applied.

There is no specific limitation to the ink and it can be suitably selected to suit to a particular application. The ink is preferably the same as that in the set of processing fluid and ink of the present disclosure.

The application of ink has no particular limit and can be suitably selected to suit to a particular application. It includes discharging and coating. Of these, discharging is preferable and inkjet discharging is more preferable.

Other Optional Device and Other Optional Step

The other optional devices are not particularly limited and can be suitably selected to suit to a particular application. They include, hut are not limited to, a first heating device and a second heating device.

The other optional processes are not particularly limited and can be suitably selected to suit to a particular application. They include, but are not limited to, first heating and second heating.

First Heating Device and First Heating

The first heating device heats fabric where processing fluid has been applied.

In the first heating, fabric where processing fluid has been applied is heated.

The first heating device and the first heating are the same as those in the application device for applying processing fluid and the application of processing Second Heating Device and Second Heating The second heating device heats fabric where processing fluid and ink have been applied after the ink is applied.

In the second heating, fabric where processing fluid and ink have been applied is heated after the ink is applied.

The processing fluid and ink applied onto the fabric are dried during the second heating.

The heating temperature during the second heating is preferably 60 degrees C. or higher and more preferably 80 degrees C. or higher, and furthermore preferably 100 degrees C. or higher.

The second heating device is not particularly limited and can be selected from known heating devices. It includes a roll heater, a drum heater, a heated wind generator, and heat pressing device.

Figure 2:
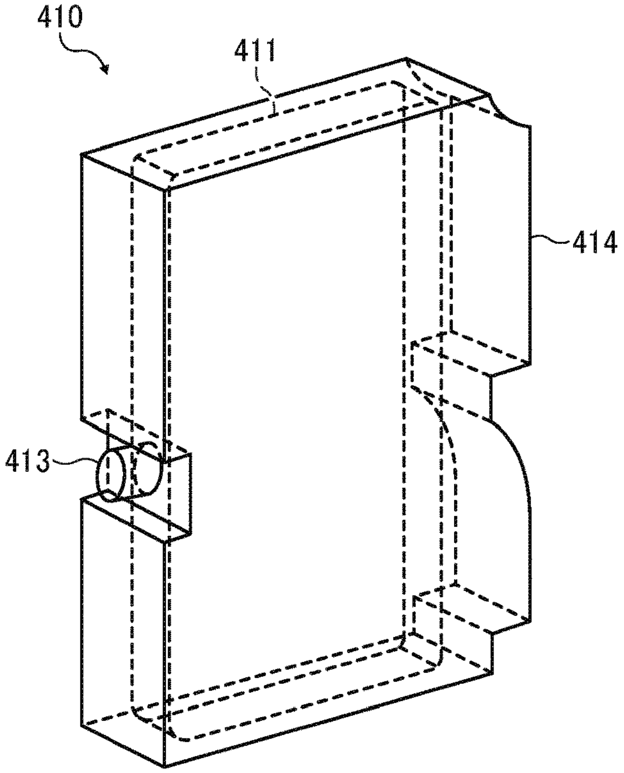
FIG. 2 is a schematic diagram illustrating an example of a container containing processing fluid according to an embodiment of the present invention.

The applying device for applying processing fluid and the image forming device are described with reference to FIG. 1 and FIG. 2. FIG. 1 is a schematic diagram illustrating an example of the image forming apparatus. FIG. 2 is a schematic diagram illustrating an example of the device for applying processing fluid.

An image forming device 400 illustrated in FIG. 1 includes a serial inkjet head. A mechanical unit 420 is disposed in an exterior 401 of the image forming device 400. An accommodating unit 411 included in a container 410*p* for containing processing fluid, a container 410*w* for containing white ink, a container 410*k* for containing black ink, or a container 410*c* for containing cyan ink is made of a packing material such as aluminum laminate film. The accommodating unit 411 is housed in a member such as a plastic container 414. Each of the containers 410 is used in a form of cartridge.

A cartridge holder 404 is disposed on the rear side of the opening appearing when a cover 401*c* is opened. The cartridge holder 404 is detachably attached to each of the container 410. Each ink discharging outlet 413 of the container 410 communicates with an inkjet discharging head 434 via each supplying tube 436. This configuration makes it possible for the inkjet discharging head 434 to discharge processing fluid and each ink to fabric as a unit for applying processing fluid and a unit for applying ink.

The image forming device 400 illustrated in FIG. 1 applies processing fluid to fabric by inkjetting but can employ another method for applying processing fluid. It includes blade coating, roll coating, and spray coating.

The image forming device 400 may optionally include a heating device for drying liquid including the processing fluid and/or white ink applied to fabric. The heating device includes a roll heater, drum heater, heated wind generator, and heat pressing device.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Examples 1 to 19 and Comparative Examples 1 to 5

Manufacturing Example of Processing Fluid

Processing fluids of Examples 1 to 19 and Comparative Examples 1 to 5 were obtained by mixing and stirring the prescriptions shown in Tables 1 to 5 below. The values of each prescription shown in Tables 1 to 5 are represented in percent by mass. The content of the resin having an amino group and resin emulsions shown in Tables 1 to 5 is solid content. The contents of the polyvalent metal salts shown in Tables 1 to 5 include hydrated water.

The names of products and manufacturers of the materials shown in Tables 1 to 5 are as follows.

Organic Solvent

Propylene glycol: manufactured by Kanto Chemical Co., Inc.

Glycerin (manufactured by Kanto Chemical Co., Inc.)

Resin Having Amino Group

SP-003 (EPOMIN (registered), polyethylene imine, amine value of 1,178 mgKOH/g, manufactured by Nippon Shokubai Co., Ltd.)

SP-012 (EPOMIN (registered), polyethylene imine, amine value of 1,066 mgKOH/g, manufactured by Nippon Shokubai Co., Ltd.)

HM-2000 (EPOMIN (registered), polyethylene imine, amine value of 1,010 mgKOH/g, manufactured by Nippon Shokubai Co., Ltd.)

Resin Emulsion (Other Resin)

SUMIKAFLEX (registered) 8501-HQ (ethylene-vinyl acetate-vinyl chloride copolymer resin emulsion, solid concentration of 45.5 percent by mass, manufactured by Sumika Chemtex Company, Limited)

Poly-Valent Metal Salt

Calcium nitrate tetrahydrate (manufactured by FUJIFILM Wako Pure Chemical Corporation)

Magnesium nitrate hexahydrate (manufactured by FUJIFILM Wako Pure Chemical Corporation)

Magnesium nitrate hexahydrate (manufactured by FUJIFILM Wako Pure Chemical Corporation)

The synthesizing method of the resins A to C having an amino group shown in Tables 1 to 5 and the measuring methods of the amine value are as follows.

Synthesis Example of Resin A Having Amino Group

A total of 134.7 g (0.5 mol) of diallyldimethyl ammonium chloride aqueous solution at 60 percent by mass and 176 g of distilled water were placed in a 500 mL four-neck flask equipped with a stirrer, a thermometer, and a reflux condenser followed by adjusting pH to 3 to 4 by hydrochloric acid. Next, 18.3 g (0.25 mol) and 3.9 g of sodium phosphite were added and dissolved by by stirring at 50 degrees C. Then, the inside temperature was raised to 60 degrees C. and 1.7 g of ammonium persulfate at 28.5 percent by mass was added. After maintaining the inside temperature of from 60 to 65 degrees C. for four hours, 3.5 of ammonium persulfate at 28.5 percent by mass was further added. After being allowed to react at 60 degrees C. for 20 hours, diallyl dimethyl ammonium chloride acrylic amide copolymer resin A having amino group, at a solid content concentration of 30 percent by mass was obtained. The amine value of the resin A having an amino group was obtained by the following method, which was 420 mgKOH/g.

Measuring Method of Amine Value

The amine value means the total amine value indicating the sum of primary amine, secondary amine, and tertiary amine and is defined as the mg number of potassium hydroxide equivalent to the amount of hydrochloric acid required to neutralize 1 g of a sample. The value was obtained by the neutralization titration described below.

The resin A obtained by the synthesizing method described above was rinsed with pure water followed by drying. An amount of from 0.5 to 2.0 g of the dried resin A was placed in a conical flask and sufficiently dissolved in 30 mL of ethanol. Next, ethanol hydrochloric acid solution having a titer of f2 at 0.2 mol/L was added dropwise from a burette until the ethanol solution was changed from green to yellow as the ending point. The titration amount was read in mL to obtain the amine value according to the following relationship.

$$\text{Amine value (mgKOH/g)}=\{\text{Amount of titration in mL})\times 56.11\text{ (mg/mL)}\times 0.2\times f2\}/\text{sample (g)}.$$

Synthesis Example of Resin B Having Amino Group

A total of 100 mL of diallyl dimethyl amine chloride/dimethyl sulfoxide at 1 mol/L and a solution of sulfur dioxide/dimethylsulfoxide at 1 mol/L were mixed in a 300 mL four-neck flask equipped with a stirrer, a thermometer, and a reflux condenser. A total of 0.82 g of azobis isobutylonitrile as polymerization initiator was added to the mixture to allow polymerization at 40 degrees C. for 24 hours. The reaction solution was added dropwise to methanol to precipitate a copolymer followed by filtering with a glass filter. The resulting substance was dried with a reduced pressure to obtain 18 g of a copolymer, resin B having amino group. Distilled water was added to the solution to obtain an aqueous solution at a solid concentration of 50 percent by mass. The amine value of the resin B having an amino group was obtained in the same manner as for the resin A, which was 250 mgKOH/g.

Synthesis Example of Resin C Having Amino Group

A total of 495 a (4.8 mol) of diethylene triamine was charged in a four-necked flask (3 litter) equipped with a thermometer, a condenser, a stirrer, and a nitrogen introducing tube, Next, 877 g (6.0 mol) of adipic acid was added thereto while being stirred. The system was then heated while purging the system of produced water to allow reaction at 150 degrees C. for five hours. Thereafter, 1,000 g of water was slowly added thereto to obtain a liquid containing polyamide polyamine. This liquid had a solid content of 52.1 percent and the viscosity at a solid of 50 percent by mass was 380 mPa·s at 25 degrees C.

A total of 100 g of the thus-obtained liquid containing polyamide polyamine (0.214 mol as amino group), 3.8 g of acetic acid (30 equivalent percent), and 4.3 g (15 equivalent percent) of aqueous solution of sodium hydroxide at 30 percent by mass were mixed and then 6.7 g of water was added to make the solid content 50 percent by mass.

Next, after 19.8 g (100 equivalent percent) of epichlorohydrine was added dropwise thereto at 30 degrees C. in one hour and the system was held at the same temperature for one hour. Thereafter, 0.8 g (2 equivalent percent) of sodium methabisulfite was added and the system was maintained at the same temperature for five hours after epichlorohydrine was dripped.

Thereafter, 1.1 g (10 equivalent percent) of sulfuric acid at 98 percent by mass and 127.0 g of water were added to prepare a substance having a solid content of 30 percent by mass followed by heating to 75 degrees C.

This temperature was maintained until the viscosity of the reaction liquid at 25 degrees C. increased to 300 mPa·s. Thereafter, 40.5 g of water was added to adjust the solid content to 26 percent by mass. Subsequent to cooling down to 25 degrees C. or lower, pH of the liquid was adjusted to 3.5.

Then, the pH was adjusted to 3.0 by 88 percent by mass formic acid to obtain an resin C having an amino group having a viscosity of 51.6 mPa·s at a solid content concentration of 25.0 parts by mass and 15.0 parts by mass. The amine value of the resin C having an amino group was obtained in the same manner as for the resin A, which was 185 mgKOH/g.

Preparation Example of White Ink

Preparation of Urethane Resin Emulsion

In a four-necked flask equipped with a stirrer, a reflux condenser, a thermometer, and a nitrogen blowing tube, 75 g of polycarbonate polyol (Duranol T5651, manufactured by Asahi Kasei Chemicals Corporation) having a number average molecular weight (Mn) of 1,000, 90 g of dicyclohexylmethane diisocyanate (H12MDI), and 200 g of acetone were allowed to react at 75 degrees C. for four hours to obtain an acetone solution of urethane prepolymer.

This solution was cooled down to 40 degrees C. Thereafter, 450 g of water was slowly added. The resulting solution was subjected to emulsification dispersion using a homogenizer.

Thereafter, an aqueous solution in which 15 g of 2-methyl-1,5-pentane diamine was dissolved in 100 g of water was added followed by stirring for one hour. The resulting solution was purged of the solvent at 50 degrees C. under a reduced pressure to obtain a urethane resin emulsion having a nonvolatile proportion of about 45 percent.

Preparation of White Pigment Dispersion A (Pigment Dispersion of Titanium Dioxide)

A total of 37.5 parts of acrylic copolymer, DISPER BYK-2008, solid content concentration of 60 percent by mass, manufactured by BYK, was dissolved in 100.0 parts of highly pure water in a beaker. A total of 30.0 parts of titanium oxide, JR-600A, primary particle diameter of 250 nm, surface treated with aluminum, manufactured by TAYCA CORPORATION, was added to the beaker followed by stirring at 5,000 rpm for 30 minutes by an Excel Auto Homogenizer, manufactured by NISSEI Corporation, until no chunk was present, followed by stirring for 30 minutes while slowly increasing the rate of rotation to 10,000 rpm.

While being cooled down with water, the liquid dispersion of titanium dioxide pigment was treated by Homogenizer (US-300T, tip diameter: 26, manufactured by NISSEI Corporation) at 2000 for one hour followed by filtering with a 5 μm membrane filter of cellulose acetate film to obtain a white pigment dispersion A having a solid content concentration of titanium dioxide pigment of 17.9 percent by mass.

Preparation of White Pigment Dispersion B (Dispersion of Silica Particulate)

A total of 5.0 parts of DISPERBYK 102, solid content concentration of 60 percent by mass, manufactured by BYK, was dissolved in 35.0 pans of highly pure water in a beaker. A total of 30.0 parts of hydrophobic silica particulate AEROSI R106, primary particle diameter of 7 nm, manufactured by TAYCA CORPORATION, was added to the beaker followed by stirring at 5,000 rpm for 30 minutes by an Excel Auto Homogenizer, manufactured by NISSEI Corporation until no chunk was present, followed by stirring for 30 minutes while slowly increasing the rate of rotation to 10,000 rpm.

While being cooled down with water, the liquid dispersion obtained was treated by Homogenizer (US-300T, tip diameter: 26, manufactured by NISSEI Corporation) at 200 μA for one hour followed by filtering with a 5 μm membrane filter of cellulose acetate film to obtain a white pigment dispersion B having a solid content concentration of silica particulate of 42.9 percent by mass.

Preparation pf White Ink A and B

The materials below excluding the white pigment dispersion A or B and the urethane resin emulsion were dissolved in deionized water to prepare a vehicle making the entire ink 100. The urethane resin emulsion, then the pigment dispersion, were admixed with the vehicle followed by filtering with a 0.8 μm filter to obtain white ink A and B.

White Ink A

- White pigment dispersion A: 45.0 percent by mass (titanium dioxide pigment), 8.06 percent by mass of entire ink
- Urethane resin emulsion: 20.0 percent by mass
- 1,3-butane diol, manufactured by Tokyo Chemical Industry Co. Ltd.: 15.0 percent by mass
- Glycerin (manufactured by Kanto Chemical Co., Inc.): 15.0 percent by mass
- Surfinol 104 (acetylene glycol surfactant, manufactured by Nissin Chemical Industry Co., Ltd.): 0.9 percent by mass
- 2-amino-2-ethyl-1,3-propane diol (manufactured by Kanto Chemical Co., Inc.): 0.5 percent by mass
- Proxel XLII (manufactured by Arch Chemical, Inc.): 0.3 percent by mass
- Deionized water: Balance White Ink B

- White pigment dispersion B; 45.0 percent by mass (titanium dioxide pigment), 8.06 percent by mass of entire ink
- Urethane resin emulsion: 20.0 percent by mass
- Glycerin (manufactured by Kanto Chemical Co., Inc.): 6.9 percent by mass
- Silica particulate dispersion: 4.5 percent by mass (silica fine particle accounting for 1.93 percent by mass of entire ink)
- Triethylene glycol monobutyl ether (manufactured by Tokyo Chemical Industry Co. Ltd.): 2.9 percent by mass
- BYK-387 (manufactured by BYK Japan KK): 0.9 percent by mass
- Triethanol amine (manufactured by Tokyo Chemical Industry Co. Ltd.): 0.4 percent by mass
- Deionized water: Balance White Ink C

- White pigment dispersion A: 33.6 percent by mass (titanium dioxide pigment), 6.01 percent by mass of entire ink
- Urethane resin emulsion: 20.0 percent by mass
- 1,3-butane diol, manufactured by Tokyo Chemical Industry Co. Ltd.: 15.0 percent by mass
- Glycerin (manufactured by Kanto Chemical Co., Inc.): 15.0 percent by mass
- Surfinol 104 (acetylene glycol surfactant, manufactured by Nissin Chemical Industry Co., Ltd.): 0.9 percent by mass
- 2-amino-2-ethyl-1,3-propane diol (manufactured by Kanto Chemical Co., Inc.): 0.5 percent by mass
- Proxel XIII (manufactured by Arch Chemical, Inc.): 0.3 percent by mass
- Deionized water: Balance White Ink D

- White pigment dispersion A: 80.0 percent by mass (titanium dioxide pigment 4.32 percent by mass of entire ink
- Urethane resin emulsion: 3.0 percent by mass
- 1,3-butane diol, manufactured by Tokyo Chemical Industry Co. Ltd.: 5.0 percent by mass
- Glycerin (manufactured by Kanto Chemical Co., Inc.): 10.0 percent by mass
- Surfinol 104 (acetylene glycol surfactant, manufactured by Nissin Chemical industry Co., Ltd.): 0.9 percent by mass 2-amino-2-ethyl-1,3-propane diol (manufactured by Kanto Chemical Co., Inc.): 0.5 percent by mass Proxel XLII (manufactured by Arch Chemical, Inc.): 0.3 percent by mass Deionized water: Balance White Ink E White pigment dispersion A: 28.0 percent by mass (titanium dioxide pigment), 5.01 percent by mass of entire ink Urethane resin emulsion: 20.0 percent by mass 1,3-butane diol, manufactured by Tokyo Chemical Industry Co. Ltd.: 15.0 percent by mass Glycerin (manufactured by Kanto Chemical Co., Inc.): 15.0 percent by mass Surfinol 104 (acetylene glycol surfactant, manufactured by Nissin Chemical Industry Co., Ltd.): 0.9 percent by mass 2-amino-2-ethyl-1,3-propane diol (manufactured by Kanto Chemical Co., Inc.): 0.5 percent by mass Proxel XIII (manufactured by Arch Chemical, Inc.): 0.3 percent by mass Deionized water: Balance White Ink F White pigment dispersion A: 62.0 percent by mass (titanium dioxide pigment percent by mass of entire ink Urethane resin emulsion: 13.0 percent by mass Ethylene glycol (manufactured by Tokyo Chemical Industry Co. Ltd.): 18.0 percent by mass BYK-387 (manufactured by BYK-Chemie GmbH): 0.9 percent by mass Triethanol amine (manufactured by Tokyo Chemical Industry Co. Ltd.): 0.1 percent by mass 1,2-benzothiazoline-3-one (manufactured by Tokyo Chemical Industry Co. Ltd.): 0.3 percent by mass Deionized water: Balance Coloring, i.e., the degree of whiteness, coloring change over time, and yellowing were evaluated using the processing fluid and white ink B obtained. The results are shown in Tables 1 to 5.

Coloring (Degree of Whiteness)

An image forming device Ri6000, manufactured by Ricoh Co., Ltd. was filled with the processing fluid and the white ink manufactured as described above and the amount of each of the processing fluid and the white ink attached was adjusted 30 mg/cm$^2$. Thereafter, a 2 cm×8 cm solid image of the processing fluid was printed with 600 dpi×600 dpi on black polyester fabric from TOMS CO., LTD. containing polyester fiber colored with black dispersion dye and satisfying 60>L* followed by drying at 130 degrees C. for 90 seconds. A 2 cm×8 cm solid image of the white ink was printed with 600 dpi×600 dpi on the region of the black polyester fabric where the processing fluid was applied followed by drying at 110 degrees C. for 10 minutes to obtain a sample image.

The luminosity (L*) of the solid image portion of the sample image obtained was subjected to measuring with a spectrophotometer, X-rite exact, manufactured by X-Rite Inc., and evaluated regarding the coloring, the degree of whiteness, according to the following evaluation criteria.

Evaluation Criteria

A: L* value is 70 or greater

B: b* is from 60 to less than 70

A: L* value is less than 60.

Coloring Change Over Time (Degree of Whiteness)

A sample image was obtained in the same manner as in Coloring (Degree of Whiteness). Within 10 minutes of the preparation of the sample image, the luminosity (L*) of the solid image portion was measured by a spectrophotometer, X-rite exact, manufactured by X-Rite Inc. The sample image obtained was allowed to rest at 25 degrees C. and 40 RH percent in a thermostatic chamber for 30 days followed by measuring the luminosity (L*) in the same manner again. The change rate of the luminosity (L*) before and after resting in the thermostatic chamber was calculated based on the following relationship: |Luminosity (L*) before resting−Luminosity (L*) after resting|×100 to evaluate the coloring change over time according to the following evaluation criteria.

Evaluation Criteria

A: Change ratio of L* is less than 5 percent

B: Change ratio of L* is 5 percent to less than 10 percent

C: Change ratio of L* is 10 percent or higher

Yellowing

A sample image was obtained in the same manner as in Coloring (Degree of Whiteness). At 24 hours after the sample image was prepared, the solid image portion of the sample image obtained was subjected to measuring chromaticity (b*) with a spectrophotometer, X-rite eXact, manufactured by X-Rite Inc., and evaluated regarding yellowing according to the following evaluation criteria.

Evaluation Criteria

A: b* is less than −1

B: b* is from −1 to less than 1

C: b* is 1 or greater

TABLE 1

| | | Example | | | | |
|---|---|---|---|---|---|---|
| | | 1 | 2 | 3 | 4 | 5 |
| | White Ink | A | A | A | A | A |
| Organic | Propylene glycol | 5.0 | 5.0 | 5.0 | 5.0 | 5.0 |
| solvent | Glycerin | 15.0 | 15.0 | 15.0 | 15.0 | 15.0 |
| Resin having | SP-003 (1178 mg/KOH/g) | 0 | 0 | 0 | 0 | 0 |
| amino group | SP-012 (1066 mg/KOH/g) | 0 | 0 | 0 | 0 | 0 |
| (amine value) | HM-2000 (1010 mg/KOH/g) | 0.010 | 0.10 | 1.0 | 5.0 | 10.0 |
| | Resin A having amino group (420 mg/KOH/g) | 0 | 0 | 0 | 0 | 0 |
| | Resin B having amino group (250 mg/KOH/g) | 0 | 0 | 0 | 0 | 0 |
| | Resin A having amino group (185 mg/KOH/g) | 0 | 0 | 0 | 0 | 0 |

TABLE 1-continued

| | | Example 1 | 2 | 3 | 4 | 5 |
|---|---|---|---|---|---|---|
| Resin emulsion | SUMIKAFLEX (registered) 850HQ | 5.0 | 5.0 | 5.0 | 5.0 | 5.0 |
| Multivalent metal salt | Calcium nitrate tetrahydrate | 21.6 | 21.6 | 21.6 | 21.6 | 21.6 |
| | Magnesium nitrate hexahydrate | 0 | 0 | 0 | 0 | 0 |
| | Magnesium sulfate hexahydrate | 0 | 0 | 0 | 0 | 0 |
| | Pure water | 53.4 | 53.3 | 52.40 | 48.4 | 43.4 |
| | Total | 100 | 100 | 100 | 100 | 100 |
| | Amine value (mgKOH/g) | 1010 | 1010 | 1010 | 1010 | 1010 |
| | Metal salt (parts by mass) | 15.0 | 15.0 | 15.0 | 15.0 | 15.0 |
| Evaluation item | Coloring (degree of whiteness) | A | A | A | A | A |
| | Coloring change over time (degree of whiteness) | B | A | A | A | A |
| | Yellowing | A | A | A | A | B |

TABLE 2

| | | Example 6 | 7 | 8 | 9 | 10 |
|---|---|---|---|---|---|---|
| | White Ink | A | A | A | A | A |
| Organic solvent | Propylene glycol | 5.0 | 5.0 | 5.0 | 5.0 | 5.0 |
| | Glycerin | 15.0 | 15.0 | 15.0 | 15.0 | 15.0 |
| Resin having amino group (amine value) | SP-003 (1178 mg/KOH/g) | 1.0 | 0 | 0 | 0 | 0 |
| | SP-012 (1066 mg/KOH/g) | 0 | 1.0 | 0 | 0 | 0 |
| | HM-2000 (1010 mg/KOH/g) | 0 | 0 | 0 | 0 | 1.0 |
| | Resin A having amino group (420 mg/KOH/g) | 0 | 0 | 1.0 | 0 | 0 |
| | Resin B having amino group (250 mg/KOH/g) | 0 | 0 | 0 | 1.0 | 0 |
| | Resin A having amino group (185 mg/KOH/g) | 0 | 0 | 0 | 0 | 0 |
| Resin emulsion | SUMIKAFLEX (registered) 850HQ | 5.0 | 5.0 | 5.0 | 5.0 | 5.0 |
| Multivalent metal salt | Calcium nitrate tetrahydrate | 21.6 | 21.6 | 21.6 | 21.6 | 5.6 |
| | Magnesium nitrate hexahydrate | 0 | 0 | 0 | 0 | 0 |
| | Magnesium sulfate hexahydrate | 0 | 0 | 0 | 0 | 0 |
| | Pure water | 52.4 | 52.4 | 52.4 | 52.4 | 68.4 |
| | Total | 100 | 100 | 100 | 100 | 100 |
| | Amine value (mgKOH/g) | 1178 | 1066 | 420 | 250 | 1010 |
| | Metal salt (parts by mass) | 15.0 | 15.0 | 15.0 | 15.0 | 4.0 |
| Evaluation item | Coloring (degree of whiteness) | A | A | A | A | B |
| | Coloring change over time (degree of whiteness) | A | A | A | B | A |
| | Yellowing | B | A | A | A | A |

TABLE 3

| | | Example 11 | 12 | 13 | 14 | 15 |
|---|---|---|---|---|---|---|
| | White Ink | A | A | A | A | B |
| Organic solvent | Propylene glycol | 5.0 | 5.0 | 5.0 | 5.0 | 5.0 |
| | Glycerin | 15.0 | 15.0 | 15.0 | 15.0 | 15.0 |
| Resin having amino group (amine value) | SP-003 (1178 mg/KOH/g) | 0 | 0 | 0 | 0 | 0 |
| | SP-012 (1066 mg/KOH/g) | 0 | 0 | 0 | 0 | 0 |
| | HM-2000 (1010 mg/KOH/g) | 1.0 | 1.0 | 1.0 | 1.0 | 0.10 |
| | Resin A having amino group (420 mg/KOH/g) | 0 | 0 | 0 | 0 | 0 |
| | Resin B having amino group (250 mg/KOH/g) | 0 | 0 | 0 | 0 | 0 |
| | Resin A having amino group (185 mg/KOH/g) | 0 | 0 | 0 | 0 | 0 |

TABLE 3-continued

| | | Example | | | | |
|---|---|---|---|---|---|---|
| | | 11 | 12 | 13 | 14 | 15 |
| Resin emulsion | SUMIKAFLEX (registered) 850HQ | 5.0 | 5.0 | 5.0 | 5.0 | 5.0 |
| Multivalent metal salt | Calcium nitrate tetrahydrate | 7.2 | 43.2 | 0 | 0.0 | 21.6 |
| | Magnesium nitrate hexahydrate | 0 | 0 | 25.9 | 0 | 0 |
| | Magnesium sulfate hexahydrate | 0 | 0 | 0 | 19.9 | 0 |
| | Pure water | 66.8 | 30.8 | 48.1 | 54.1 | 53.3 |
| | Total | 100 | 1.00 | 100 | 100 | 100 |
| | Amine value (mgKOH/g) | 1010 | 1010 | 1010 | 1010 | 1010 |
| | Metal salt (parts by mass) | 5.0 | 30.0 | 15.0 | 15.0 | 15.0 |
| Evaluation item | Coloring (degree of whiteness) | A | A | A | A | A |
| | Coloring change over time (degree of whiteness) | A | A | A | A | A |
| | Yellowing | A | A | A | A | A |

TABLE 4

| | | Example | | | |
|---|---|---|---|---|---|
| | | 16 | 17 | 18 | 19 |
| | White Ink | C | D | E | F |
| | Propylene glycol | 5.0 | 5.0 | 5.0 | 5.0 |
| Organic solvent | Glycerin | 15.0 | 15.0 | 15.0 | 15.0 |
| Resin having amino group (amine value) | SP-003 (1178 mg/KOH/g) | 0 | 0 | 0 | 0 |
| | SP-012 (1066 mg/KOH/g) | 0 | 0 | 0 | 0 |
| | HM-2000 (1010 mg/KOH/g) | 0.010 | 0.010 | 0.010 | 0.010 |
| | Resin A having amino group (420 mg/KOH/g) | 0 | 0 | 0 | 0 |
| | Resin B having amino group (250 mg/KOH/g) | 0 | 0 | 0 | 0 |
| | Resin A having amino group (185 mg/KOH/g) | 0 | 0 | 0 | 0 |
| Resin emulsion | SUMIKAFLEX (registered) 850HQ | 5.0 | 5.0 | 5.0 | 5.0 |
| Multivalent metal salt | Calcium nitrate tetrahydrate | 21.6 | 21.6 | 21.6 | 21.6 |
| | Magnesium nitrate hexahydrate | 0 | 0 | 0 | 0 |
| | Magnesium sulfate hexahydrate | 0 | 0 | 0 | 0 |
| | Pure water | 53.4 | 53.4 | 53.4 | 53.4 |
| | Total | 100 | 100 | 100 | 100 |
| | Amine value (mgKOH/g) | 1010 | 1010 | 1010 | 1010 |
| | Metal salt (parts by mass) | 15.0 | 15.0 | 15.0 | 15.0 |
| Evaluation item | Coloring (degree of whiteness) | A | A | B | A |
| | Coloring change over time (degree of whiteness) | A | A | A | A |
| | Yellowing | A | A | A | A |

TABLE 5

| | | Comparative Example | | | | |
|---|---|---|---|---|---|---|
| | | 1 | 2 | 3 | 4 | 5 |
| | White Ink | A | A | A | A | B |
| Organic solvent | Propylene glycol | 5.0 | 5.0 | 5.0 | 5.0 | 5.0 |
| | Glycerin | 15.0 | 15.0 | 15.0 | 15.0 | 15.0 |
| Resin having amino group (amine value) | SP-003 (1178 mg/KOH/g) | 0 | 0 | 0 | 0 | 0 |
| | SP-012 (1066 mg/KOH/g) | 0 | 0 | 0 | 0 | 0 |
| | HM-2000 (1010 mg/KOH/g) | 11.0 | 0 | 0 | 0.001 | 0 |
| | Resin A having amino group (420 mg/KOH/g) | 0 | 0 | 0 | 0 | 0 |
| | Resin B having amino group (250 mg/KOH/g) | 0 | 0 | 0 | 0 | 0 |
| | Resin A having amino group (185 mg/KOH/g) | 0 | 1.0 | 0 | 0 | 0 |

TABLE 5-continued

| | | Comparative Example | | | | |
|---|---|---|---|---|---|---|
| | | 1 | 2 | 3 | 4 | 5 |
| Resin emulsion | SUMIKAFLEX (registered) 850HQ | 5.0 | 5.0 | 5.0 | 5.0 | 5.0 |
| Multivalent metal salt | Calcium nitrate tetrahydrate | 21.6 | 21.6 | 21.6 | 21.6 | 21.6 |
| | Magnesium nitrate hexahydrate | 0 | 0 | 0 | 0 | 0 |
| | Magnesium sulfate hexahydrate | 0 | 0 | 0 | 0 | 0 |
| | Pure water | 42.4 | 52.4 | 53.4 | 53.4 | 53.4 |
| | Total | 100 | 100 | 100 | 100 | 100 |
| | Amine value (mgKOH/g) | 1010 | 185 | — | 1010 | — |
| | Metal salt (parts by mass) | 15.0 | 15.0 | 15.0 | 15.0 | 15.0 |
| Evaluation item | Coloring (degree of whiteness) | A | A | A | A | A |
| | Coloring change over time (degree of whiteness) | A | C | C | C | C |
| | Yellowing | C | A | A | A | A |

Aspects of the present disclosure include, but are not limited to, the following:

1. A processing fluid for fabric contains a resin having an amino group and an amine value of 200 to 1,200 mgKOH/g and a polyvalent metal salt, wherein the proportion of the resin to the processing fluid is from 0.01 to 10 percent by mass, wherein the processing fluid is applied to fabric.
2. The processing fluid according to 1 mentioned above, wherein the amine value is from 400 to 1,100 mgKOH/g.
3. The processing fluid according to 1 or 2 mentioned above, wherein the proportion of the polyvalent metal salt to the processing fluid is from 5.0 percent by mass or more.
4. The processing fluid according to any one of 1 to 3 mentioned above, wherein the proportion of the resin to the processing fluid is from 0.1 to 5.0 percent by mass.
5. The processing fluid according to any one of 1 to 4 mentioned above, wherein the resin contains polyethylene imine.
6. The processing fluid according to 7 one of 1 to 5 mentioned above, where the fabric contains polyester or acetate fiber.
7. The processing fluid according to any one of 1 to 6 mentioned above, wherein the polyester or acetate fiber is colored with a dispersion dye.
8. A set contains the processing fluid of any one of 1 to 7 mentioned above and an ink.
9. The set according to 8 mentioned above further comprising the fabric.
10. The set according to 9 mentioned above, wherein the fabric contains polyester or acetate fiber.
11. The set according to 10 mentioned above, wherein the polyester or acetate fiber is colored with a dispersion dye.
12. A set contains the processing fluid of any one of 1 to 7 mentioned above and a white ink containing water, titanium oxide, glycerin, silicon dioxide, triethylene glycol monobutyl ether, and triethanol amine.
13. A set contains the processing fluid of any one of 1 to 7 mentioned above and an ink containing white pigment accounting for 6 to 15 percent by mass of the ink.
14. A device for applying the processing fluid of any one of 1 to 7 mentioned above includes a container containing the processing fluid and a unit for applying the processing fluid to the fabric.
15. An image forming device includes a container containing the processing fluid of any one of 1 to 7 mentioned above, a unit for applying the processing fluid to the fabric, and a unit for applying an ink to the region of the fabric where the processing fluid has been applied.
16. A method of applying processing fluid includes applying the processing fluid of any one of 1 to 7 mentioned above to the fabric.
17. An image forming method includes applying the processing fluid of any one of 1 to 7 mentioned above to the fabric and applying an ink to the region of the fabric where the processing fluid has been applied.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A set comprising:

a processing fluid; and an ink, wherein the processing fluid comprises:

a resin having an amino group and an amine value of from 200 to 1,200 mgKOH/g; and a polyvalent metal salt, wherein a proportion of the resin to the processing fluid is from 0.01 to 10.0 percent by mass, wherein the ink comprises a white ink comprising:

water;

titanium oxide;

glycerin;

silicon dioxide;

triethylene glycol monobutyl ether; and triethanol amine, and wherein the titanium oxide and the silicon dioxide are dispersed in the white ink, and aggregate upon contact with the polyvalent metal salt of the processing fluid.

2. The set according to claim 1, wherein the amine value is from 400 to 1,100 mgKOH/g.

3. The set according to claim 1, wherein a proportion of the polyvalent metal salt to the processing fluid is 5.0 percent by mass or more.

4. The set according to claim 1, wherein a proportion of the resin to the processing fluid is from 0.1 to 5.0 percent by mass.

5. The set according to claim 1 further comprising:

a fabric, wherein the fabric comprises fiber colored with a dispersion dye.

6. The set according to claim 5, wherein the fabric comprises polyester fiber colored with a dispersion dye or acetate fiber colored with a dispersion dye.

7. The set according to claim 6, wherein the fabric comprises polyester fiber colored with a dispersion dye.

8. The set according to claim 1, wherein the ink comprises a white pigment accounting for 6 to 15.0 percent by mass of the ink.

9. The set according to claim 1, further comprising an applying device comprising:

a container containing the processing fluid; and a unit configured to apply the processing fluid to fabric.

10. The set according to claim 1, further comprising an image forming device comprising:

a container containing the processing fluid;

a unit configured to apply the processing fluid to the fabric; and a unit configured to apply an ink to a region of the fabric where the processing fluid has been applied.

11. An applying method comprising:

applying the set of claim 1 to fabric.

12. An image forming method comprising:

applying the processing fluid of claim 1 to fabric; and applying the ink to a region of the fabric where the processing fluid has been applied.

13. The set according to claim 1, wherein the resin comprises polyethylene imine.

* * * * *